Figure 2:
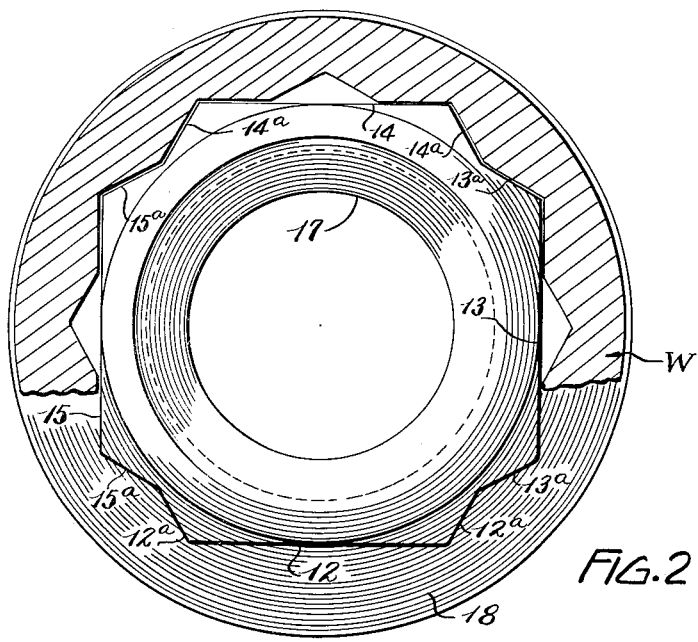

Nov. 9, 1965

D. H. KLUTH 3,216,302

EIGHT-CORNERED NUT

Filed Jan. 21, 1963

INVENTOR.
DONALD H. KLUTH
BY Williams, David,
Hoffmann & Yount.
ATTORNEYS

United States Patent Office 3,216,302
Patented Nov. 9, 1965

3,216,302
EIGHT-CORNERED NUT
Donald H. Kluth, North Royalton, Ohio, assignor to The Lamson & Sessions Company, Cleveland, Ohio, a corporation of Ohio
Filed Jan. 21, 1963, Ser. No. 252,662
2 Claims. (Cl. 85—32)

The present invention relates to a nut or nut blank, and particularly to a lock nut having light weight, high strength and torque-transmitting ability.

In industries such as aircraft and space industries it is essential that the nuts and lock nuts which are used have good holding power, high strength and be of relatively light weight.

Heretofore, one of the conventional lock nuts used in the industry has been a twelve-point lock nut having twelve torque-transmitting points and a flange at the forward end of the lock nut to provide strength. This lock nut will provide the necessary torque-transmitting power but certain problems are involved in the manufacture of the nut since the twelve-point arrangement does not provide any convenient flat for feeding and locating the nut during manufacture and also does not provide sides to which a distorting force can be conveniently applied to distort the nut to provide the locking action without damaging the torque-transmitting points of the nut.

Other conventional lock nuts which have been used, such as a conventional hexagonal lock nut, have a relatively heavy weight and the nut does not provide, in many cases, sufficient torque-transmitting power to enable the nut to be torqued with the necessary forces.

Accordingly, an important object of the present invention is to provide a new and improved lightweight nut blank or lock nut constructed to provide a number of points to be driven by a twelve-point socket wrench with the points of the nut having sufficient torque-transmitting ability to meet the requirements of the aircraft and space industries, but yet, constructed in such a manner that flats are provided to enable the manufacture of the nut to be simplified.

Another object of the present invention is to provide a nut as in the preceding object which can be driven with either an open-ended wrench, fixed or adjustable, or with a square or twelve-point socket wrench.

Still another object of the present invention is to provide an eight-cornered nut with the corners so arranged that the nut can be driven by a twelve-point socket wrench or an open-ended wrench of either the fixed or adjustable type and can be guided during manufacture by engaging opposed parallel flats.

A further object of the present invention is to provide an eight-cornered nut with the corners so arranged that the nut can be driven by a twelve-point socket wrench or an open-ended wrench of either the fixed or adjustable type and with the points constructed so as to have a close fit with the driving points of a twelve-point socket wrench, which has driving points defined by two hexagons symmetrically offset to provide twenty-four faces.

A still further object of the present invention is to provide a new and improved high strength, lightweight nut adjusted to be driven by a twelve-point socket wrench and which can be distorted to make the nut a lock nut by applying distorting forces to opposed flats on the nut.

Yet another object of the present invention is to provide a high strength, lightweight lock nut which has been distorted to provide the locking action and which does not require a crown to enable distorting by passing the nut between spaced rolls having fixed axes.

It is also an object of the present invention to provide a new and improved lightweight, high strength lock nut which is constructed in such a manner that better control of nut distortion can be obtained when distorting forces are applied to the nut to provide the nut with self-locking characteristics.

In the preferred embodiment of the present invention, a nut, particularly a lock nut, is constructed to have eight driving points defined by outer surfaces of the nut which intersect at an angle of intersection of less than 180° with the driving points being located at the corners of a square polyhedron defined by the planes of the sides of the nut, and being adapted to be driven by a twelve-point socket wrench, the adjacent points at a corner of the nut having surfaces which intersect at an angle facing outwardly of the nut of less than 180°. Preferably the nut has a flange at one end thereof.

Figure 1:
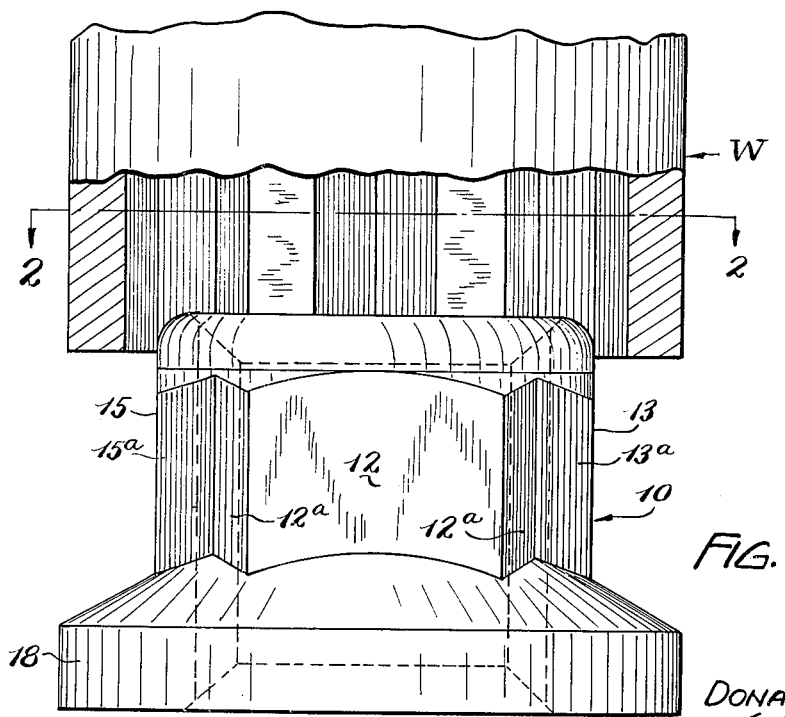

Further objects and advantages of the present invention will be apparent from the following description thereof made with reference to the accompanying drawings forming a part of the present specification and in which:

FIG. 1 is a side elevational view of a nut embodying the present invention and a driving tool therefor, with parts cut away; and FIG. 2 is a view taken approximately along line 2—2 of FIG. 1, looking in the direction of the arrows.

Referring to the drawings, the present invention is embodied in a nut, preferably a lock nut, shown as comprising a body 10 which is cut away at the corners thereof to define driving points which are adapted to be received in the recesses of a twelve-point, socket-type driving tool. The body 10 has four sides 12, 13, 14 and 15 which respectively lie in a plane that is perpendicular to the plane of the adjacent sides with the four planes defining a polyhedron which is square in cross section. Each of the sides 12, 13, 14 and 15 terminates equidistantly from the planes of the adjacent sides and the nut body 10 has outer peripheral surfaces which lie in planes at each end of each side with the surfaces extending inwardly with respect to the plane of the side and defining with the side an included angle which is obtuse, an angle of 120° in the illustrated embodiment. These surfaces at each end of a side have been given the same reference numeral as the side with an "a" appended thereto. Accordingly, the side 12 has inwardly extending surfaces 12a at each end thereof, the side 13 has inwardly extending surfaces 13a at each end thereof, the side 14 has inwardly extending surfaces 14a at each end thereof, and the side 15 has inwardly extending surfaces 15a at each end thereof. The inwardly extending surfaces at each corner of the nut intersect each other at an angle facing outwardly of the nut of less than 180° and in the illustrated embodiment, the surfaces intersect at an angle of 150°.

The nut body 10 has an axial threaded opening 17 therethrough and preferably has a circular flange portion 18 at the forward end thereof which is the end which leads the nut onto the receiving bolt. The flange extends circumferentially beyond the square polyhedron defined by the sides of the nut body. The nut body shown in the drawings may be distorted to provide a locking action by applying distorting forces to the opposite side faces of the nut. The nut after distortion may have an opening at the trailing end thereof which is out of round and conforms to the configuration shown in dotted lines in FIG. 2. The distorting may be done conventionally as by striking the opposite sides or the corners of the nut with inwardly moving die members or by passing the nut between rolls which are rotatable about fixed axes a predetermined distance apart and which engage the opposite sides thereof. Moreover, the distorting forces may be applied to the sides of the nut at any desired distance from the flange portion of the nut. In the absence of flats, for example when a lock nut is constructed as the twelve-point nut shown in Patent No. 2,588,372, there is no place except the crown of the nut at which to apply distorting forces when rolls are used if the forces are to be applied without distortion of the driving points. When, however, flat sides are provided as in the illustrated embodiment, the distorting force may be applied on the sides of the nut at any desired distance from the flange and better control of the deflection and distortion of the nut can be obtained. This requires no crown on the nut and provides a lightweight nut. The deflection for a given distorting force will vary depending on the point of force application on the nut. The greater the distance of the place of application of the distorting force from the flange, the greater deflection for a given force and hence finer control. Overdistortion or underdistortion may be a problem when the forces are applied to the outer end, or trailing end of the nut, such as must be done in the twelve-point nut shown in Patent No. 2,588,372, if the driving points are not to be damaged, and by moving the application of the forces toward the flange, this problem may be minimized.

In addition to providing a nut which may be conveniently handled, located and fed during the manufacture of the nut and convenient surfaces for distorting the nut body, the construction of the nut allows the nut to be wrenched with an open-ended wrench, either fixed or adjustable, or a twelve-point socket wrench, such as illustrated in the drawings and desiganted by the reference character W. In the preferred embodiment, the points on the nut are defined by surfaces which intersect at an angle facing inwardly of the nut of 120° and the surfaces at each corner of the nut defining the point of intersection at an angle facing outwardly of the nut of approximately 150°. These are the angles for the recesses and the points of the twelve-point driving tool and provide a close driving fit between the tool and the nut and maximum torque-transmitting ability.

Tests have shown that the torque-transmitting ability of a flange lock nut in accordance with the present invention is, when driven with a twelve-point driving tool, sufficient to meet the rigid specifications of the aircraft and space industries, but yet the nut is considerably lighter than the common twelve-point lock nut of the flange type. The eight-point nut can be made with the same minimum wall thickness as the twelve-point flange lock nut so that the strength is equivalent thereto, but yet will have less total metal and, therefore, will be lighter.

In view of the foregoing, it can be seen that the present invention provides a new and improved lock nut of a lightweight type having high torque-transmitting ability per unit weight and constructed so that it may be driven with an open-ended wrench, either flat, fixed or adjustable, or a twelve- point socket tool, the mating between the eight points of the nut and the tool will be such as to provide high torque-transmitting ability.

While the preferred embodiment of the present invention has been described in considerable detail, it is hereby my intention to cover all constructions, modifications, and arrangements which fall within the ability of those skilled in the art and within the scope and spirit of the present invention.

Having described my invention, I claim:

1. A nut comprising a body having four sides each lying in a respective plane perpendicular to the planes of the adjacent sides with the planes defining a polyhedron square in cross section, each of said sides terminating the same distance short of the planes of the adjacent sides and said body having an outer surface at each end of each of said sides extending inwardly of the plane of the side at an included angle facing inwardly of the body of about 120° and intersecting the surface extending inwardly from the other plane at that corner of the nut body at an included angle facing outwardly of the body of substantially 150° to define driving points adapted to be received in driving recesses defined by the points of a 12 point socket wrench, said sides being of a length considerably greater than that of said surfaces with the length of said surfaces being equal and the length of said sides being equal and such that the driving points at the opposite ends of each of said sides defined by the side and the adjacent surfaces are receivable in respective recesses in a 12 point socket wrench separated by one intermediate recess.

2. A nut comprising a body having four sides each lying in a respective plane perpendicular to the planes of the adjacent sides with the planes defining a polyhedron square in cross section, each of said sides terminating the same distance short of the planes of the adjacent sides and said body having an outer surface at each end of each of said sides extending inwardly of the plane of the side at an included angle facing inwardly of the body of about 120° and intersecting the surface extending inwardly from the other plane at that corner of the nut body at an included angle facing outwardly of the body of substantially 150° to define driving points adapted to be received in driving recesses defined by the points of a 12 point socket wrench, said sides being of a length considerably greater than that of said surfaces with the length of said surfaces being equal and the length of said sides being equal and such that the driving points at the opposite ends of each of said sides defined by the side and the adjacent surfaces are receivable in respective recesses in a 12 point socket wrench separated by one intermediate recess, and a flange at one end of said nut extending radially outwardly of the driving points on said body.

References Cited by the Examiner

UNITED STATES PATENTS

| | | | |
|---|---|---|---|
| 1,933,007 | 10/33 | Dieter | 85—32 |
| 2,588,372 | 3/52 | Erb | 85—32 |

EDWARD C. ALLEN, *Primary Examiner.*